United States Patent [19]
Byland et al.

[11] Patent Number: 5,806,241
[45] Date of Patent: Sep. 15, 1998

[54] SELF-WATERING PLANT HOLDER

[75] Inventors: William J. Byland; Norwin G. Heimos, both of St. Louis, Mo.

[73] Assignee: Mickey's Mini-Flora Express, Ltd., St. Louis, Mo.

[21] Appl. No.: 564,493

[22] Filed: Nov. 29, 1995

[51] Int. Cl.⁶ .................................................. A01G 31/02
[52] U.S. Cl. ..................................... 47/81; 47/71
[58] Field of Search ................... 471/71, 81, 79

[56] References Cited

U.S. PATENT DOCUMENTS

| | | | |
|---|---|---|---|
| D. 350,913 | 9/1994 | Heimos | D11/164 |
| 3,455,055 | 7/1969 | Chate | 47/71 |
| 3,557,490 | 1/1971 | Delaney | 47/38.1 |
| 4,117,632 | 10/1978 | Pearce | 47/81 |
| 4,356,665 | 11/1982 | de Oliveira | 47/80 |
| 4,389,815 | 6/1983 | English et al. | 47/81 |
| 4,996,792 | 3/1991 | Holtkamp, Sr. | 47/81 |
| 5,094,032 | 3/1992 | Byland et al. | 47/66 |

FOREIGN PATENT DOCUMENTS

| | | | |
|---|---|---|---|
| 233181 | 1/1960 | Australia | 47/71 |
| 1170322 | 1/1959 | France | 47/71 |
| 874221 | 3/1953 | Germany | 47/71 |
| 11461 | 7/1891 | United Kingdom | 47/71 |
| 754597 | 8/1956 | United Kingdom | 47/71 |

*Primary Examiner*—Michael J. Carone
*Assistant Examiner*—Joanne C. Downs
*Attorney, Agent, or Firm*—Senniger, Powers, Leavitt & Roedel

[57] ABSTRACT

A self-watering plant holder including a container constructed for holding a quantity of liquid for watering a plant. The container has an opening generally in the top of the container permitting access to the quantity of liquid contained therein, and a first coupling component. The plant holder further includes a pot constructed to hold the plant holder therein. The pot is sized for close-fitting reception in the container opening and includes a second coupling component interengageable with the first coupling component of the container for drawing the pot into tight, substantially sealing engagement with the container thereby to substantially close the opening in the container for preventing liquid in the container from escaping the container.

8 Claims, 2 Drawing Sheets

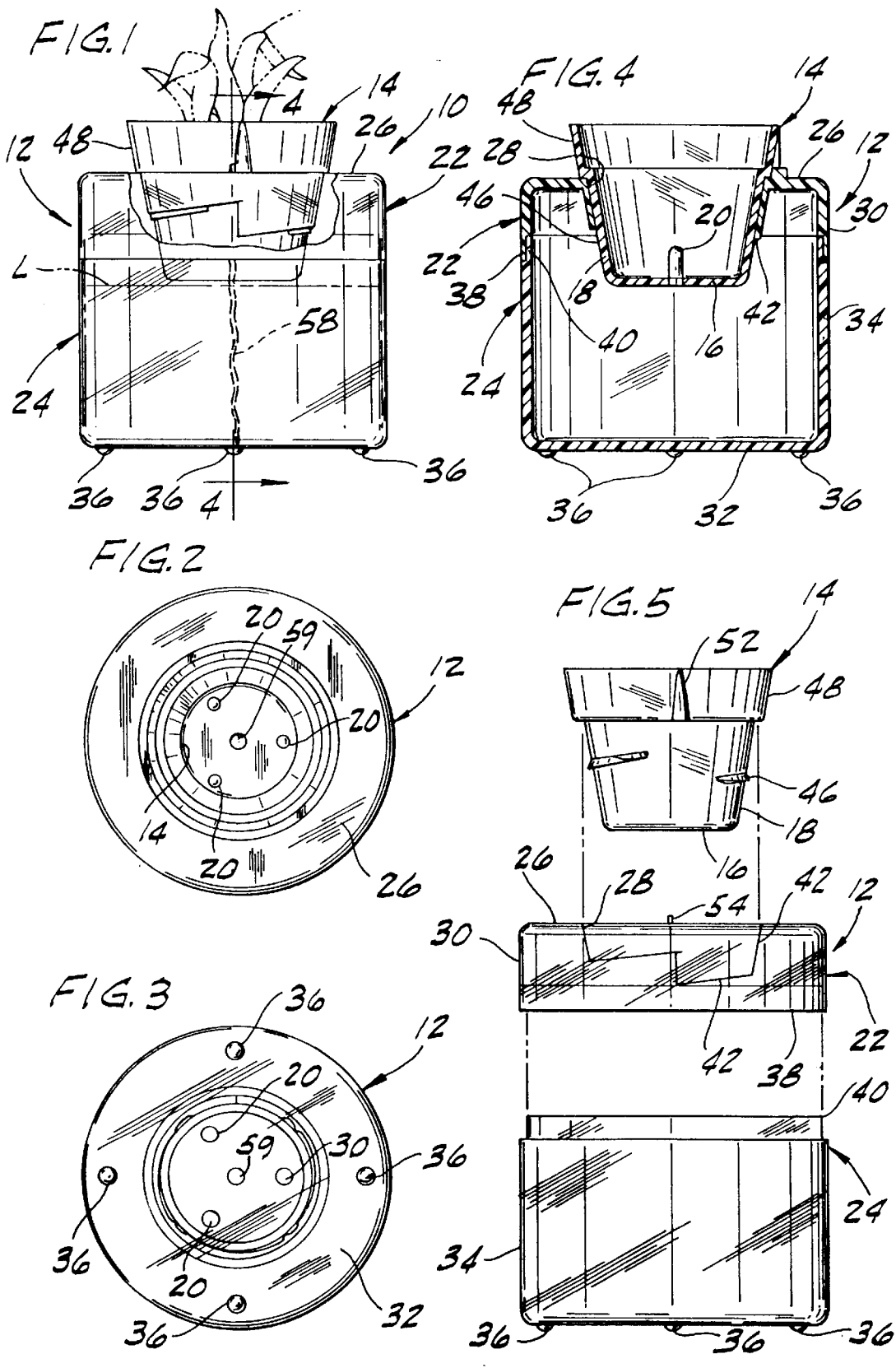

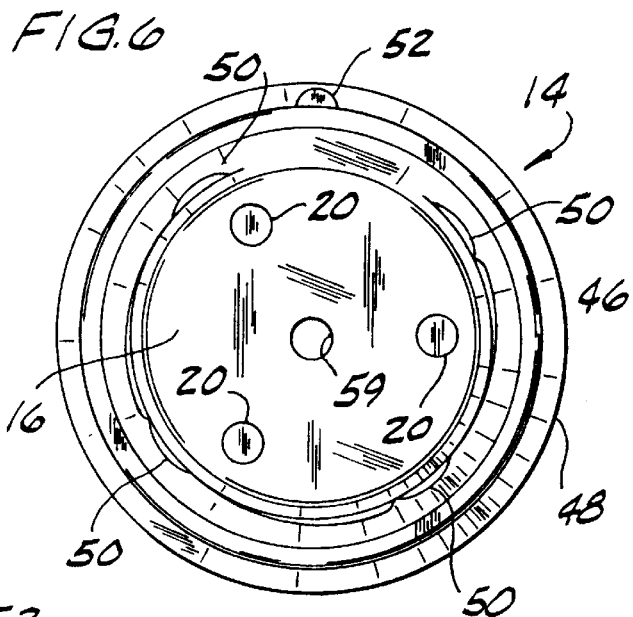
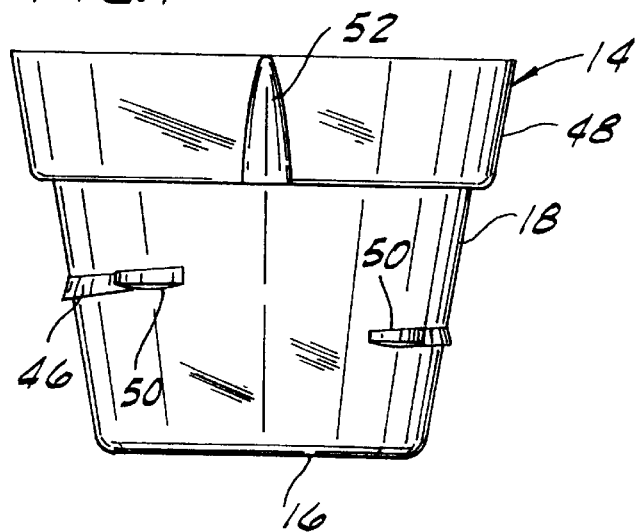
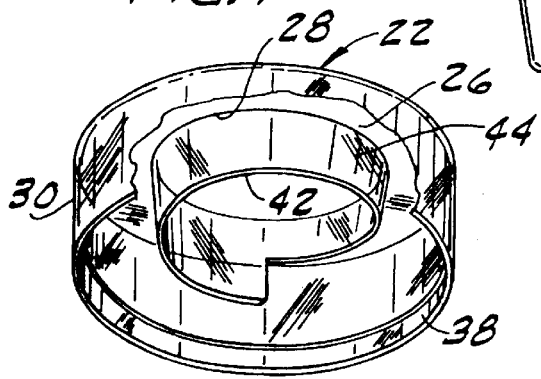
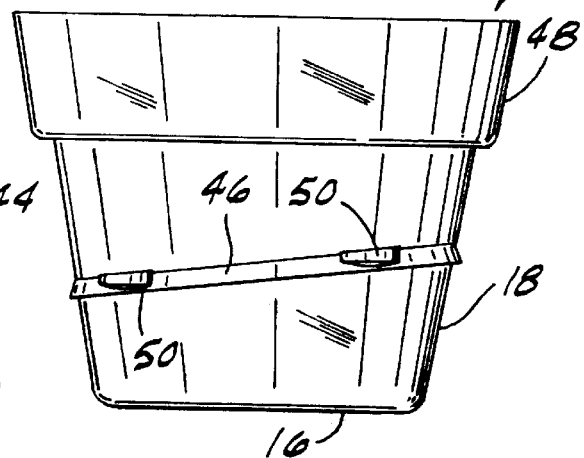

SELF-WATERING PLANT HOLDER

BACKGROUND OF THE INVENTION

This invention relates generally to plant holders and more particularly to plant holders containing a reservoir of liquid to provide the plant nourishment for a number of days without refilling the reservoir.

The present invention has particular, though not exclusive, application to the field of miniature plants sold in retail stores and other places where the plants receive no watering or other care. Miniature plants individually contained in a pot filled with soil or other suitable mediums, are shipped by growers to retailers who sell the plants. The shipment may take a number of days over which the plants may not have any source of nourishment. Therefore, the plants are delivered in self-watering plant holders comprising a pot and a container for holding a mixture of water and liquid plant food to provide the plant with nourishment during shipment and while on display for sale.

Generally, self-watering plant holders designed to hold water require that the reservoir be filled only at the final destination of the plant. These plant holders are shipped to a retailer without water in the container to prevent leakage of water during shipment. The containers are designed with openings for insertion of a pot which is frictionally held within the container. Any type of movement during shipment can result in leakage past the pot and container interface, especially if the box containing the plants is turned on its side or upside down during shipment. To prevent water leakage the plants are normally shipped without water. This requires costly shipping to ensure the plants reach their destination as quick as possible. Plant holders that are designed for shipment with liquid generally can hold only a small amount of liquid without leaking. This requires the retailer to open each individual plant holder and add more water to it immediately upon receiving the shipment, prior to placing the plant holders on display for sale.

Accordingly, there is presently a need for a self-watering plant holder that can be shipped with a volume of water in the holder so that it can be placed directly on the shelf for sale by the retailer.

SUMMARY OF THE INVENTION

Among the several objects of this invention may be noted the provision of a self-watering plant holder that can hold liquid without leaking during movement of the plant holder; the provision of such a plant holder that permits easy access for filling the holder with liquid; and the provision of such a plant holder that is economical to manufacture and easy to use.

Generally, a self-watering plant holder of this invention comprises a container constructed for holding a quantity of liquid for watering a plant. The container has an opening generally in the top of the container permitting access to the quantity of liquid contained therein, and a first coupling component. The holder further comprises a pot constructed to hold the plant and sized for close-fitting reception in the container opening. The pot includes a second coupling component interengageable with the first coupling component of the container for drawing the pot into tight, substantially sealing engagement with the container thereby to substantially close the opening in the container for preventing liquid in the container from escaping the container.

Other objects and features will be in part apparent and in part pointed out hereinafter.

BRIEF DESCRIPTION OF THE DRAWINGS

FIG. 1 is a front elevation showing a self-watering plant holder of this invention with parts broken away to show internal construction;

FIG. 2 is a top elevation of the plant holder of FIG. 1;

FIG. 3 is a bottom elevation of the plant holder of FIG. 1;

FIG. 4 is a cross-sectional view of the plant holder taken in the plane including line 4—4 of FIG. 1;

FIG. 5 is a front elevation of the plant holder of FIG. 1 with the plant holder exploded to show its component parts;

FIG. 6 is a bottom elevation of a pot of the plant holder of FIG. 1;

FIG. 7 is a left side elevation of the pot of FIG. 6;

FIG. 8 is a right side elevation of the pot of FIG. 6; and

FIG. 9 is a perspective of an upper portion of a container of the plant holder of FIG. 1.

Corresponding parts are designated by corresponding reference characters throughout the several views of the drawings.

DETAILED DESCRIPTION OF THE PREFERRED EMBODIMENT

Referring now to the drawings, and first to FIGS. 1–3, there is generally indicated at 10 a self-watering plant holder of this invention. The plant holder 10 comprises a container 12 constructed for holding a quantity of water and liquid plant food for watering a plant P, and a pot generally indicated at 14 constructed to hold the plant and soil therein. The pot 14 may hold many different sizes and types of plant. The plant holder 10 illustrated in the drawings and described herein is of the type used to hold miniature plants for sale in places where the plants will receive no care until sold. However, it is to be understood that plant holders of the present invention may be used for larger plants without departing from the scope of the present invention.

The pot 14 is generally of the type disclosed in co-assigned U.S. Pat. No. 5,094,032, which is incorporated herein by reference. The pot is preferably molded plastic and comprises a circular base 16 and a frustoconical side wall 18 integrally formed with and projecting upward from the periphery of the base. The pot has a plurality of hook-shaped root anchors 20 integrally formed with the base and projecting upwardly therefrom for engagement by the roots of a plant so as to anchor the plant to the pot. The pot 14 of the present invention has certain important differences from the pot disclosed in U.S. Pat. No. 5,094,032, which are described below.

The container 12 comprises an upper portion and a lower portion (designated generally at 22 and 24, respectively) which are both transparent. The transparency of the walls provides for visibility of the liquid level within the container. The upper portion 22 includes a top wall 26 (FIG. 2) having an opening 28 therein for receiving the pot 14 holding the plant, and a cylindrical side wall 30 depending from the peripheral edge of the top wall. The lower portion 24 includes a bottom wall 32 and a cylindrical side wall 34 extending up from the peripheral edge of the bottom wall. The lower portion 24 of the container includes four feet 36 extending from its bottom wall 32 for supporting the container on a table or any other suitable surface (FIGS. 1 and 3). The feet 36 are preferably integrally molded with the bottom wall 32 of the container 12.

The upper and lower portions 22, 24 are mated together at a joint including a flange 38 on the upper portion and a lip 40 on the lower portion. The flange 38 is formed by an outward recession of the interior surface of the side wall 30 around its lower edge, and the lip 40 is formed by an inward recession of the exterior surface of the side wall 34 around its upper edge. The lip 40 and the flange 38 have the same height so that when the upper and lower portions 22, 24 are mated, the flange fits completely over the lip. When the upper and lower portions 22, 24 are mated together, their sidewalls 30, 34 form a continuous cylindrical side wall of the container. The upper and lower portions 22, 24 are preferably sonically welded together at their joint to prevent leakage of liquid. The water and plant food can be added through the opening 28 in the top wall 26. It is to be understood that a container may be formed from more than two pieces or as a one piece unit and still fall within the scope of the invention. The container 12 is preferably molded from a plastic material, but may be formed of any other suitable material.

The plant holder 10 includes a coupling system comprising in the illustrated embodiment a lower edge 42 of an annular lip 44 depending from the top wall 26 at the periphery of the opening 28, and a ridge 46 extending laterally outwardly from the side wall 18 of the pot 14. As explained more fully hereinafter, the lower edge 42 and lip 44 are adapted for threaded interengagement to couple the pot 14 and container together in tight, sealing relation (see FIGS. 1 and 4). However it is to be understood that the coupling system may be other than the threaded type construction shown herein and still fall within the scope of the present invention. For instance, it is envisioned that a bayonet connection (not shown) could be used to couple the container and pot in sealing relation. Pegs on one of the pot and annular lip could be forced into shaped slots on the other of the pot and annular lip.

The annular lip 44 of the container 12 is formed so that the lower edge 42 extends along a spiral from one end to the other (FIG. 9). The lip 44 tapers inwardly from the top wall 26 to the lower edge 42, generally conforming to the tapered shape of a lower sidewall 18 of the pot. The ridge 46 is integrally formed on the pot 14 and extends along a spiral so that the ridge and lower edge 42 of the annular lip are formed for threaded connection. A rim 48 at the top of the pot 14 has a greater diameter than that of the opening 28 in the top wall 26 of the container 12, and is engageable with the top wall to limit the amount by which the pot can be inserted into the opening.

The pot 14 is sized for close-fitting reception in the container opening 28. The pot 14 is inserted into the opening 28 far enough to place a portion of the ridge 46 at a level lower than at least a segment of the lower edge 42 of the annular lip 44. The pot 14 is rotated in a clockwise direction (as viewed in FIG. 2 from above the container 12) to bring the ridge 46 into threaded engagement with the lower edge 42 of the annular lip 44, so that as the pot is further rotated it is pulled down into the container. The side wall 18 of the pot substantially seals against the depending annular lip 44 of the container 12 as it is forced downwardly into the opening 28. The ridge 46 includes four generally horizontal plateaus 50 (FIG. 6) along its length having a greater height than the remainder of the ridge for strength when the ridge engages the lower edge of the annular lip 44. When the ridge 46 of the pot 14 is fully engaged with the annular lip 44 of the container 12, a seal is formed, thus preventing liquid from escaping from within the container through the opening 28 in the top wall 26 of the container.

The rim 48 of the pot 14 includes a rib 52 projecting outward which is engageable with an upwardly projecting stop 54 formed on the top wall 26 of the container 12 to prevent the pot from being overtightened in the opening 28. The rib 52 is aligned with the ends of the lower edge 42 of the annular lip 44 and contacts the stop 54 located on the upper surface of the top wall 26 of the container 12 when the pot 14 is fully threaded into the container (FIG. 1). The pot 14 is made of a resilient material which conforms to the portion of the container 12 engaged by the pot for sealing with the container. The pot may be formed from polyurethane or any other suitable material.

A wick 58 (shown in phantom in FIG. 1) extends between the pot 14 and the liquid in the container 12 for communicating liquid from the container to the pot. The wick 58 may be made of any material which provides a capillary action through which the plant receives liquid. The size of the wick 58 is selected to accommodate the amount of liquid required to be transferred by the wick. The length of the wick 58 is preferably long enough to reach the bottom wall 32 of the container 12 so that the plant may receive water even when there is only a small amount of water remaining in the container.

To use the pot holder 10 of this invention, a plant P is grown in the pot 14 and a wick 18 is inserted into the pot through a central opening 59 in the bottom wall 16. The container 12 is subsequently filled nearly to the top of its lower portion 24 with water. The water level should preferably be just below the pot 14 when the pot is sealingly engaged with the container 12. The level of liquid in the container 12 is indicated by the line L in FIG. 1. The pot 14 is then inserted into the opening 28 of the top wall 26 of the upper portion 22 of the container 12 and rotated such that the raised ridge 46 is threadedly engaged with the spiral shaped lower edge 42 of the annular lip 44, thus substantially sealing the pot 14 and the container 12. Rotation is stopped when the rib 52 on the pot rim 48 engages the stop 54 on the container 12.

The plant absorbs water and plant food through the wick 58 as required. The plant can therefore be shipped to a store and placed directly on the shelf and sold to the consumer without having to put water and plant food in the container 12. The tight seal between the pot 14 and container 12 allow for shipment of the plant holder with water in the container without water spillage during shipment.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A self-watering plant holder comprising:

a container constructed for holding a quantity of liquid for watering a plant, the container having an opening generally in the top of the container permitting access to the quantity of liquid contained therein, a lip extending downwardly from the periphery of the opening into the container, and a first coupling component comprising a first thread member defined by a generally spiral shaped lower edge of the lip;

a pot constructed to hold the plant therein and sized for close-fitting reception in the container opening, the pot including a second coupling component comprising a second thread member interengageable with the first thread member of the container where the pot is received in the container opening for drawing the pot into tight, substantially sealing engagement with the container thereby to substantially close the opening in the container for preventing liquid in the container from escaping the container.

2. A plant holder as set forth in claim 1 wherein the first and second coupling components are constructed for pulling the pot downwardly into the container and into tight engagement with the container upon interengagement of the first and second coupling components.

3. A plant holder as set forth in claim 2 wherein said second thread member comprises a raised ridge projecting laterally outwardly from the pot and disposed on the pot for threaded interengagement with the spiral shaped lower edge of the lip on the container for screwing the pot down into the container into a substantially sealing relationship with the container.

4. A plant holder as set forth in claim 3 further comprising a wick adapted to extend between the pot and the liquid in the container for communicating liquid from the container to the pot.

5. A plant holder as set forth in claim 4 wherein the pot is made of a resilient material which conforms to the portion of the container engaged by the pot for sealing with the container.

6. A plant holder as set forth in claim 3 wherein the container comprises a stop positioned for engaging the pot when the pot is fully threaded into the container.

7. A plant holder as set forth in claim 1 wherein the lip is generally annular and tapers toward its lower edge, and wherein the pot comprises a side wall tapering from the top of the pot toward the bottom, the lip and pot side wall being adapted for sealing engagement upon threaded interengagement of the lower edge of the lip with the second thread member of the pot.

8. A plant holder as set forth in claim 1 wherein the container a comprises a top wall, a bottom wall and a side wall extending between the top and bottom walls, the lip extending downwardly from the opening being disposed radially inwardly of the side wall of the container.

* * * * *